Jan. 23, 1968    S. M. SCAVETTO    3,364,668
RAKE
Filed Feb. 4, 1965
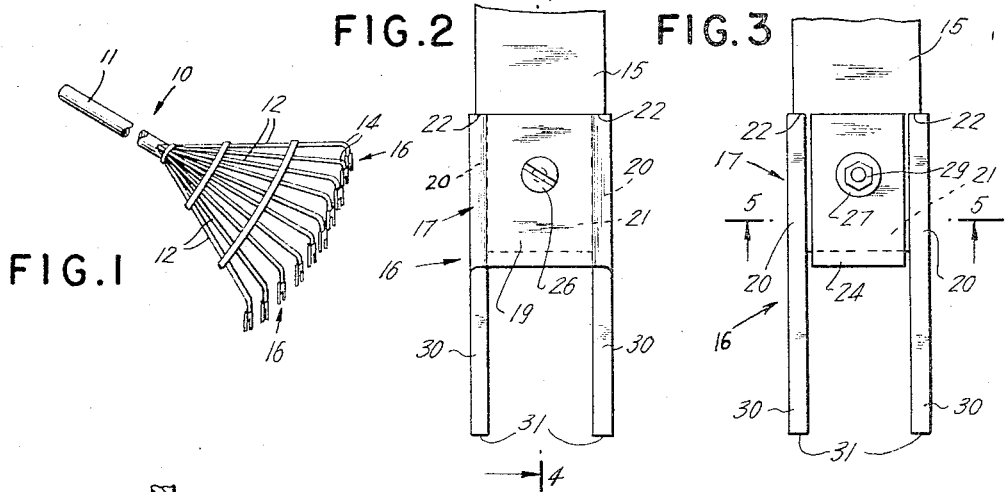
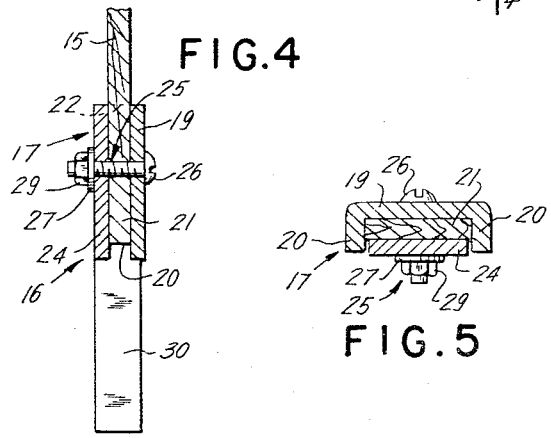
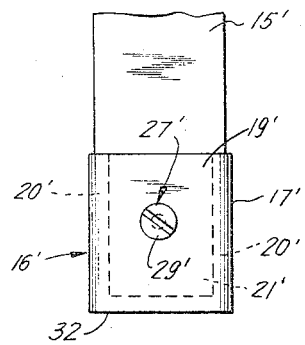
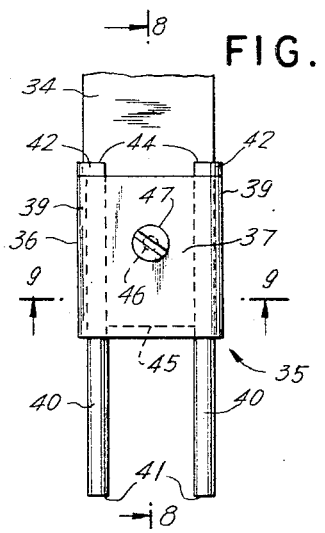
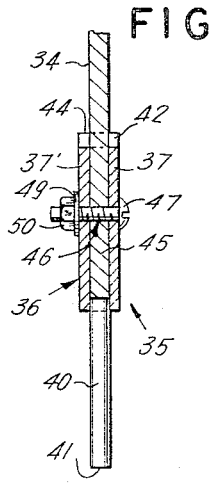
INVENTOR.
SAMUEL M. SCAVETTO
BY Alfred W. Vibber
ATTORNEY

United States Patent Office 3,364,668
Patented Jan. 23, 1968

3,364,668
RAKE
Samuel M. Scavetto, 45 Walnut Road,
Maywood, N.J. 07607
Filed Feb. 4, 1965, Ser. No. 430,383
8 Claims. (Cl. 56—400.17)

ABSTRACT OF THE DISCLOSURE

The invention relates to rakes having replaceable ground-engaging tip members on the ends of the rake tines, and to such replaceable tip members. The tip members have a body with a ferrule-like portion having opposed walls, such ferrule-like portion being adapted to be telescoped over and secured to the end of the respective tine of the rake, and two laterally spaced generally parallel fingers projecting from opposite sides of the outer free edge of the ferrule-like portion, the outer free ends of the fingers constituting ground-engaging surfaces on the tip member.

In a first illustrated embodiment of the invention the fingers are formed as extensions of opposite sides of the ferrule-like portion. In another illustrated embodiment the fingers are formed as rods separate from the ferrule-like portion and having body portions adapted to be disposed and gripped between an edge of a tine on a rake and the corresponding sidewall of the ferrule-like portion of the tip member.

---

The rake of the present invention and the removable ground-engaging members for the tines thereof are illustrated herein in connection with flexible broom types of rakes having either wood (bamboo) or metal tines or teeth. Such broom type of rake, particularly if the tines are made of wood or bamboo, is prone to wearing at a rapid rate, the ground-engaging ends of the tines also frequently splitting. Further, it is virtually impossible to change the character or configuration of the ground-engaging ends of the tines of such rake. Thus different rakes are ordinarily required for different jobs around a house in order best to carry out the jobs of grass raking, leaf and trash raking, and cultivation. The rake of the present invention and the removable ground-engaging tips for the tines thereof permit a single rake to be readily adapted for performing each of the above tasks simply by providing the rake with ground-engaging members best suited for a particular task. After such task has been completed, the ground-engaging members may be removed and replaced with others particularly adapted for another type of work.

The invention has among its objects the provision of a novel rake with replaceable ground-engaging tips for the rake tines thereof.

A further object of the invention lies in the provision, in the combination of rake and removable ground-engaging members for the ends of the tines thereof, of improved novel means for securely retaining such members on the ends of the tines of the rake.

Another object of the invention is the provision of replaceable tips for rake tines, such tips having ground-engaging members of novel configuration.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in perspective of a bamboo broom type rake, such rake including replaceable ground-engaging members on the ends of the tines thereof in accordance with a first illustrative embodiment of the invention;

FIG. 2 is an enlarged view in front elevation of the end portion of one of the tines of the rake of FIG. 1 and of the removable ground-engaging member mounted thereon;

FIG. 3 is a view similar to FIG. 2 but in rear elevation;

FIG. 4 is a fragmentary view in vertical section through the end of the rake tine and the first embodiment of ground-engaging member secured thereto, the section being taken along the line 4—4 of FIG. 2;

FIG. 5 is a view in horizontal section through the end of the tine shown in FIGS. 2, 3, and 4, the section being taken along the line 5—5 in FIG. 3, the view showing the ground-engaging member in section;

FIG. 6 is fragmentary view in front elevation of the end of the tine of a rake having a second embodiment of ground-engaging member mounted thereon;

FIG. 7 is a view in front elevation of a third embodiment of ground-engaging member for a rake tine, the view showing a fragment of the end of the tine on which the member is mounted;

FIG. 8 is a view in vertical section through the end of the rake tine and the third embodiment of ground-engaging member mounted thereon, the section being taken along the line 8—8 of FIG. 7; and FIG. 9 is a view in horizontal section through an intermediate portion of the third embodiment of ground-engaging member and the end of the tine of the rake on which the member is mounted, the section being taken along the line 9—9 of FIG. 7.

As evident from the above, there are shown herein three embodiments of rakes having removable ground-engaging members on the tips of the tines thereof: The first illustrative embodiment is shown in FIGS. 1–5, inclusive; the second embodiment is shown in FIG. 6; and the third embodiment is shown in FIGS. 7, 8, and 9. For purposes of illustration, the rakes of the first and second embodiments, including the tines thereof, are descibed as being made of bamboo, whereas the tine of the rake of FIGS. 7, 8, and 9 is made of metal. It will be understood, however, that the removable ground-engaging members of all three illustrative embodiments may be interchanged, that is, any of them may be employed on rakes having either wood or metal tines or teeth, as desired.

The broom type rake which is shown in FIG. 1 and generally designated by the reference character 10 has both the handle 11 and the strips or slats 12 thereof made of bamboo. As is conventional in such type of rake, the ends of the strips or slats 12 are bent at 14 to provide downwardly directed tines or teeth portions 15 at the ends of the slats 12. Each of such tines 15 in the embodiment shown is provided with a removable ground-engaging member 16 in accordance with the first illustrative embodiment of the invention.

The structure of the ground-engaging members 16 is shown more particularly in FIGS. 2–5, inclusive. As there shown, the main portion of the body 17 of the removable member 16 is of generally channel section, having a flat front plate portion 19 and two rearwardly directed spaced parallel wing portions 20. Member 17 may conveniently be formed as a sheet metal stamping although, of course, it can be made of other materials and in other manners. The body 17 is retained on the end of the tine 15 by being telescoped over the end portion 21 of the tine. In the embodiment shown, portion 21 of the tine is of slightly less width than the main body thereof, and has two opposite shoulders 22 which rest upon the upper edges of the wings 20 of the body 17. Portion 21 of the tine is of such width as firmly to be engaged between the inner surfaces of wings 20. The member 16 is retained upon the tine 15 to form a prolongation thereof by means including a rear or cover plate 24 which overlies the rear surface of portion 21 of tine 15 and lies within the wings 20 substantially flush with the rear edges thereof. Plate 24 may also conveniently be formed of sheet metal. A bolt 25 extending through aligned holes in members 19, 21, and 24 when tightened holds such members strongly compressively against each other. As shown, the head 26 of the bolt 25 is preferably disposed forwardly, there being a washer 27 overlying plate 26 and a nut 29 on the end of the bolt. The main portion 17 and the cover plate 24 of member 16 constitute a two-part ferrule receiving the outer end of the rake tine.

In the embodiment of FIGS. 1–5, inclusive, the ground-engaging members 30 are in the form of spaced parallel fingers which are prolongations of the wings 20 of body 17. The lower end surfaces 31 of fingers 30 may be flat and lie transverse to the length of the fingers, as shown, whereby to provide sharp forward and rear corners thereon which are particularly effective in raking grass cuttings or thatch. Such lower end surfaces of the fingers, however, may be made of a variety of configurations such as being rounded in either or both the planes of FIGS. 2 and 4, as desired.

The second embodiment of replaceable ground-engaging member for the tine of a rake is shown in FIG. 6. Such member is essentially the same as that of FIGS. 1–5, inclusive, with the fingers 30 removed therefrom. Accordingly, the tine and the parts of the removable ground-engaging tip therefor in FIG. 6 are designated by the same reference characters as in FIGS. 1–5, inclusive, but with added primes.

In the embodiment of FIG. 6, the lower or outer edges of the front plate member 19', the side wings 20', and of the rear cover plate (not specifically shown) of the replaceable ground-engaging member 16' lie in a common horizontal plane designated 32. Such edges of the front and rear plates and of the side wings constitute the ground-engaging surfaces of the tip member. Because of the breadth of the lower edges of the front and rear plates, the tines have a substantial effective width which somewhat exceeds that of the tine 15' proper. The configuration of the ground-engaging surfaces of member 16' may also be varied, as desired.

In the third embodiment of the combination of rake tine and removable ground-engaging tip portion thereof shown in FIGS. 7, 8, and 9, the tine of the rake is designated 34 and the removable ground-engaging tip thereof is generally designated 35. As above set forth, the tine 34 in this embodiment is made of metal, being generally in the form of a flat leaf spring. The removable tip member 35 has a body 36 in the form of a somewhat flattened ferrule, which may be made of metal, having generally flat parallel forward and rear plate portions 37 and 37', respectively. Such forward and rear plate portions are joined by rounded end portions 39.

Within such rounded end portions 39 and lying alongside the opposite side edges of the portion 45 of the tine which lies within the ferrule are two elongated vertically extending rod-like members 40, the lower end surfaces 41 of which engage the ground during use of the rake. Members 40 have outwardly directed partial heads 42 which overlie the upper edge of the ferrule at the ends 39 thereof. The lower end portion 45 of the tine 34 is of reduced width, being notched on opposite sides to provide recesses receiving the members 40 therewithin. The upper ends 44 of such recesses form shoulders which engage the upper surfaces of the heads 42.

As with the other illustrative embodiments, the removable tip 35 of FIGS. 7, 8, and 9 is further retained upon the tine 34 by a bolt 46 which passes through the plate portions 37 and 37' of the ferrule and through the portion 45 of the tip of the tine. Preferably for convenience, the head 47 of the bolt is disposed to overlie the front plate 37 with a washer 39 and a nut 50 mounted on a bolt rearwardly of the rear plate 37.

In the embodiment shown, the members 40 are unattached to the ferrule, except by being thrust sidewardly into the ends 39 thereof by the portion 45 of the tine 34, and by being locked against longitudinal movement with respect to the ferrule and tine by reason of the described engagement between the partial heads 42 of the members 40, the upper edge of the ferrule, and the shoulders 44 in the tine 34. With such construction, the ground-engaging members 40 may be readily replaced, as required, by removing the ferrule from the tine, sliding the old members 40 from the ferrule, replacing them by new members 40, and remounting the assembly of ferrule and members 40 on the rake tine. The members 40 may, however, be permanently secured to the ferrule by being soldered or welded thereto. In such case, the complete tip member 35 is replaced when the ground-engaging ends of members 40 are worn or it is desired to mount tip members with different configurations on the rake tines.

It will be seen from the above that the present invention provides replaceable ground-engaging members for the tines or teeth of rakes which are advantageous for a number of reasons. Such replaceable members are simply and economically made and installed upon or removed from the tines of a rake. The members may be made of strong, wear-resistant material, such as metal, and thus add greatly to the useful life of a rake. The ground-engaging members may be made with different configurations of the ground-engaging surface or surfaces thereof. Thus one rake body and a plurality of sets of ground-engaging members of different configurations are all that are needed for all of the raking tasks about a home.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus the bolts shown employed to aid in retaining the ground-engaging members on the tines of the rake may, if desired, be replaced by fastenings such as rivets, although this is ordinarily not desired.

What is claimed is:

1. A rake having a plurality of tines, and separate tip members secured to the ends of the respective tines, the tip members each having a body with a ferrule-like portion having opposed walls, such ferrule-like portion being telescoped over and secured to the end of the respective tine, the tip member having two laterally spaced generally parallel fingers, the respective fingers projecting from opposite sides of the outer free edge of the ferrule-like portion of the tip member, the outer free ends of the fingers constituting ground-engaging surfaces on the member.

2. A rake as claimed in claim 1, wherein the tines are of rectangular section, the ferrule-like portion of each of the tip members has a hollow rectangular body snugly receiving the end of the tine, said fingers projecting generally from the end of the tine to which said tip member is attached.

3. A rake as claimed in claim 2, comprising outwardly projecting similar extensions forming fingers on the tip members, the outer free ends of the fingers together forming the ground-engaging surface of the tip member.

4. A rake as claimed in claim 1, wherein said fingers are in the form of elongated rods, each rod having a body portion disposed and gripped between an edge of the tine and the corresponding sidewall of the ferrule-like portion.

5. A tip member adapted to be secured to the end of a respective tine of a rake, the tip member having a body with a ferrule-like portion having opposed walls, such ferrule-like portion being adapted to be telescoped over and secured to the end of a tine of the rake, the tip member having two laterally spaced generally parallel fingers, the respective fingers projecting from opposite sides of the outer free edge of the ferrule-like portion of the tip member, the outer free ends of the fingers constituting ground-engaging surfaces on the tip member.

6. A tip member as claimed in claim 5, wherein the ferrule-like portion of the tip member has a hollow rectangular body adapted snugly to receive the end of the tine, and the fingers project generally parallel to the longitudinal axis of the ferrule-like portion.

7. A tip member as claimed in claim 6, wherein the body of the tip member has spaced parallel end walls, and wherein the fingers are formed as outwardly projecting similar generally parallel extensions of said end walls.

8. A tip member as claimed in claim 6, wherein said fingers are in the form of elongated rods, each rod having a body portion adapted to be disposed and gripped between an edge of the tine and the corresponding sidewall of the ferrule-like portion.

References Cited
UNITED STATES PATENTS

| | | | |
|---|---|---|---|
| 1,239,687 | 9/1917 | Hanamma | 56—400.17 |
| 1,471,989 | 10/1923 | Weis | 56—400.04 |
| 2,663,987 | 12/1953 | Biener | 56—400.17 |
| 2,721,439 | 10/1955 | Chrunka | 56—400.17 |

ABRAHAM G. STONE, *Primary Examiner.*

P. A. RAZZANO, *Assistant Examiner.*